(12) United States Patent
Hagawa et al.

(10) Patent No.: US 9,817,471 B2
(45) Date of Patent: Nov. 14, 2017

(54) METHOD FOR ADDING INFORMATION AND SERVER APPARATUS

(71) Applicant: Panasonic Intellectual Property Corporation of America, Torrance, CA (US)

(72) Inventors: Reiko Hagawa, Osaka (JP); Yasunori Ishii, Osaka (JP); Sotaro Tsukizawa, Osaka (JP); Masaki Takahashi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/228,334

(22) Filed: Aug. 4, 2016

(65) Prior Publication Data

US 2017/0068873 A1    Mar. 9, 2017

Related U.S. Application Data

(60) Provisional application No. 62/214,303, filed on Sep. 4, 2015.

(30) Foreign Application Priority Data

May 27, 2016    (JP) .................................. 2016-106557

(51) Int. Cl.
*G06K 9/62*    (2006.01)
*G06F 3/00*    (2006.01)
(Continued)

(52) U.S. Cl.
CPC ............... *G06F 3/00* (2013.01); *G06N 99/00* (2013.01); *G06N 99/005* (2013.01); *G06K 9/00979* (2013.01)

(58) Field of Classification Search
CPC .. G06K 9/6202; G06K 9/4604; G06K 9/6267; G06K 9/00442
(Continued)

(56) References Cited

U.S. PATENT DOCUMENTS

| 6,965,694 B2 * | 11/2005 | Ueda | G06T 7/20 382/197 |
| 7,968,832 B2 * | 6/2011 | Okuda | G01J 3/46 250/201.3 |

(Continued)

FOREIGN PATENT DOCUMENTS

| JP | 10-267671 | 10/1998 |
| JP | 2008-217831 | 9/2008 |

*Primary Examiner* — Yosef Kassa
(74) *Attorney, Agent, or Firm* — Greenblum & Bernstein, P.L.C.

(57) ABSTRACT

An image transmitted, through a network, from any of at least one terminal having a function of capturing an image or obtaining an image from another device is obtained. A probability that the obtained image includes a certain imaging target is calculated. If the probability is higher than a first threshold, information indicating the certain imaging target is added to the image. If the probability is lower than a second threshold, the information indicating the certain imaging target is not to the image. If the probability is equal to or higher than the second threshold and if the probability is equal to or lower than the first threshold, the image and request reception information for requesting addition of the information is transmitted to the image to any of the at least one terminal through the network.

14 Claims, 6 Drawing Sheets

(51) Int. Cl.
*G06N 99/00* (2010.01)
*G06K 9/00* (2006.01)

(58) Field of Classification Search
USPC ....... 382/156, 158, 159, 165, 190, 209, 278; 358/537, 539, 452, 453
See application file for complete search history.

(56) References Cited

U.S. PATENT DOCUMENTS

| | | | | |
|---|---|---|---|---|
| 8,165,397 | B2 * | 4/2012 | Doretto | G06K 9/4614 |
| | | | | 382/181 |
| 8,360,776 | B2 * | 1/2013 | Manard | F41A 33/00 |
| | | | | 434/16 |
| 8,412,730 | B2 * | 4/2013 | Shiiyama | G06K 9/468 |
| | | | | 707/769 |
| 8,452,451 | B1 * | 5/2013 | Francis, Jr. | B25J 9/1658 |
| | | | | 700/245 |
| 8,457,406 | B2 * | 6/2013 | Doretto | G06K 9/4614 |
| | | | | 382/181 |
| 2015/0093035 | A1 * | 4/2015 | Saptharishi | G06K 9/00771 |
| | | | | 382/226 |

* cited by examiner

IMAGING TARGET

METHOD FOR ADDING INFORMATION AND SERVER APPARATUS

BACKGROUND

1. Technical Field

The present disclosure relates to a method for adding information to an image or the like.

2. Description of the Related Art

The accuracy of an image recognition technique called "deep learning" is rapidly improving. In the deep learning, unlike in preceding techniques, feature values used for recognition are automatically learned. On the other hand, in order to construct a recognition system employing the deep learning, a data set of a large number of learning images is necessary.

When a certain object (any kind of living creature or structure such as an animal or stairs) included in an image is to be recognized in the deep learning, a data set of a large number of images including the certain object is created and used for the learning. It is known that, in order to improve the recognition accuracy, it is effective to comprehensively collect a large number of various images including an object to be recognized. Aside from the deep learning, it is increasingly desired to collect various images including a certain imaging target, for example, for study purposes or in order to manage a service for providing particular images.

In Japanese Patent No. 4297193 and Japanese Unexamined Patent Application Publication No. 10-267671, methods for collecting a large number of images are disclosed.

SUMMARY

In one general aspect, the techniques disclosed here feature a method for adding information used by a processor of the server. The method includes obtaining an image transmitted, through a network, from any of at least one terminal having a function of capturing an image or obtaining an image from another device, calculating a probability that the obtained image includes a certain imaging target, adding, if the probability is higher than a first threshold, information indicating the certain imaging target to the image, not adding, if the probability is lower than a second threshold, the information indicating the certain imaging target to the image, and transmitting, if the probability is equal to or higher than the second threshold and if the probability is equal to or lower than the first threshold, the image and request reception information for requesting addition of the information to the image to any of the at least one terminal through the network.

According to the present disclosure, information can be comprehensively and efficiently added to various images that do not reflect a person's intention while suppressing human costs in the entirety of a system.

It should be noted that general or specific embodiments may be implemented as a system, a method, an integrated circuit (IC), a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
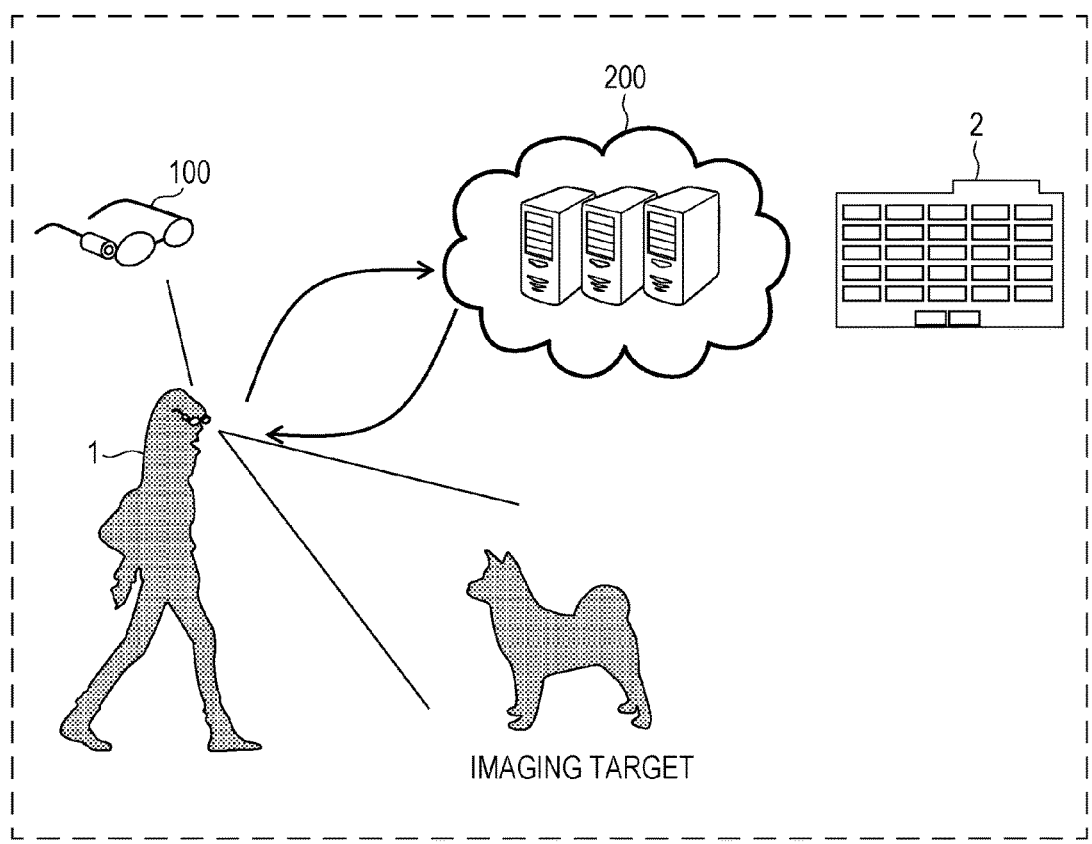
FIG. 1 is a diagram illustrating an example of an outline of a system.

Underlying Knowledge Forming Basis of the Present Disclosure

When a large number of images are collected for a certain object, a method may be used in which, as in Japanese Patent No. 4297193, a client requests a photographer to obtain images including the certain object. In this technique, the client specifies, to the photographer, an object to be included in images, that is, an imaging target. In this case, however, the photographer tries to obtain clear images in which the imaging target is in focus at the center of the images without any other object in front of the imaging target, unless otherwise specified by the client. That is, the captured images undesirably reflect the photographer's intention insofar as the photographer captures the images, and, as a result, similar images in which the imaging target is clearly captured are collected. The accuracy of recognizing an image improves when an image data set used for learning includes few similar images (that is, when the image data set includes various images). On the other hand, an image data set created by the technique disclosed in Japanese Patent No. 4297193 might undesirably include similar images.

In Japanese Unexamined Patent Application Publication No. 10-267671, a method is disclosed in which a camera is mounted on a moving object such as an automobile and automatically obtains images. In this case, a large number of images that do not reflect a person's intention can be obtained. The obtained images, however, do not necessarily include an imaging target. The photographer therefore needs to determine whether each of the obtained images includes the imaging target. In addition, in Japanese Unexamined Patent Application Publication No. 10-267671, positional information is used for identifying an object included in an obtained image. That is, when the method disclosed in Japanese Unexamined Patent Application Publication No. 10-267671 is used, it might be automatically determined whether to include an image of a stable object, such as a road or a landmark, in an image data set relating to roads or landmarks. If the imaging target is a moving object such as a bicycle, it is difficult to determine whether to include an image in an image data set relating to bicycles on the basis of positional information. In addition, it is difficult to always automatically identify an object included in an obtained image on the basis of positional information. For example, even at the same position, a desired imaging target, such as a road, might not be included if the camera is directed upward. When the method disclosed in Japanese Unexamined Patent Application Publication No. 10-267671 is used, therefore, a person needs to determine whether each of obtained images includes an imaging target.

In Japanese Patent No. 4297193 and Japanese Unexamined Patent Application Publication No. 10-267671, a method has not been examined in which only images relating to a certain object are extracted from a large number of images that do not reflect a photographer's intention and a large image data set is created (or tag information is added to the images relating to the certain object).

A method for adding information in the present disclosure is a method for adding information used by a processor of the server. The method includes obtaining an image transmitted, through a network, from any of at least one terminal having a function of capturing an image or obtaining an image from another device, calculating a probability that the obtained image includes a certain imaging target, adding, if the probability is higher than a first threshold, information indicating the certain imaging target to the image, not adding, if the probability is lower than a second threshold, the information indicating the certain imaging target to the image, and transmitting, if the probability is equal to or higher than the second threshold and if the probability is equal to or lower than the first threshold, the image and request reception information for requesting addition of the information to the image to any of the at least one terminal through the network.

As a result, an image collection and tag addition system can be constructed that obtains a large number of images and that, for an image for which a determination whether the image includes an imaging target can be easily made, makes the determination in a short period of time using a machine or that, for an image for which it is difficult to make a determination whether the image includes an imaging target, makes an accurate determination. Information can therefore be comprehensively added to the large number of various images that do not reflect a person's intention while suppressing human costs in the entirety of a system.

In addition, the request reception information may include a command for displaying an instruction screen for receiving, from the at least one terminal, a result of a determination whether the image includes the imaging target.

As a result, a user who owns a terminal can easily add information to the image.

In addition, the method may further include obtaining, from the at least one terminal, a result of a determination whether the image includes the imaging target received on the basis of the instruction screen, adding, if the result of the determination indicates that the image includes the imaging target, information indicating the certain imaging target to the image, and not adding, if the result of the determination indicates that the image does not include the imaging target, the information indicating the certain imaging target to the image.

As a result, an appropriate determination can be made for an image for which it is difficult for the server to make a determination whether (or not) to add the information.

In addition, in the calculating, a calculator, which is included in the server, for calculating a probability that an image includes a certain imaging target may be used.

In addition, the calculator may be constructed through deep learning, a histogram of oriented gradients (HOG), a support vector machine (SVM), or any selective combination thereof.

In addition, the method may further include accumulating, by adding information to a plurality of images, the plurality of images to which the information has been added and updating the calculator using the plurality of images to which the information has been added.

As a result, as the number of images to which the information has been added using the method increases, the accuracy of adding the information using the method improves.

In addition, the first threshold and the second threshold may be different between when the probability is calculated using a calculator constructed using less than a certain number of images to which the information has been added and when the probability is calculated using a calculator constructed using the certain number of images or more to which the information has been added.

In addition, if the probability is calculated using the calculator constructed using less than the certain number of images to which the information has been added, the first threshold may be set larger and the second threshold may be set smaller than when the probability has been calculated using the calculator constructed using the certain number of images or more to which the information has been added.

As a result, when the number of images to which the information has been added using the method is smaller than a certain value, the calculator has not been sufficiently constructed. By increasing the first threshold and decreasing the second threshold, therefore, the number of images to which the information is added by the user (photographer) of the terminal increases.

In addition, in the obtaining, the server may obtain a device identifier of the at least one terminal from the at least one terminal along with the image. In the transmitting, the server may identify the device identifier obtained along with the image and transmit the image and the request reception information to the at least one terminal having the identified device identifier.

As a result, since the person (photographer) who has obtained the image can add the information to the image, it can be efficiently determined whether the image includes the certain imaging target.

In addition, in the obtaining, a device identifier of the at least one terminal may be obtained from the at least one terminal along with the image. In the transmitting, the device identifier obtained along with the image may be identified, and the image and the request reception information may be transmitted to a terminal different from the at least one terminal having the identified device identifier.

As a result, since a person different from the person who has obtained the image can add the information to the image, it can be objectively determined whether to add the information.

Furthermore, the method may further include transmitting, after determining whether to add the information to the image, information for providing a reward to the at least one terminal. If the probability relating to the image is equal to or higher than the second threshold and if the probability is equal to or lower than the first threshold, the reward may be set higher than when the probability is higher than the first threshold or lower than the second threshold.

As a result, since a reward is high when there are many images whose probabilities relating to the images are equal to or higher than the second threshold and whose the probabilities are equal to or lower than the first threshold and otherwise the reward is low, the photographer can understand what kind of images a client desires.

In addition, before the image is obtained, a determination as to the certain imaging target may be received from the at least one terminal.

An embodiment described hereinafter is a specific example of the present disclosure. Values, shapes, components, steps, the order of the steps, and the like described in the following embodiment are examples, and do not limit the present disclosure. Among the components described in the following embodiment, ones not described in the independent claims, which define broadest concepts, will be described as arbitrary components.

Embodiment

System Outline

FIG. 1 is a diagram illustrating an outline of an image collection system according to an embodiment. The outline of the image collection system will be described hereinafter with reference to FIG. 1.

The image collection system includes an imaging device 100 owned by a photographer 1 and a server apparatus 200 owned by a client 2.

The imaging device 100 is a mobile terminal capable of performing communication, inputting, and capture and display of an image, such as smart glasses. The server apparatus 200 is a cloud server that collects a large amount of information from various imaging devices and that processes the information.

Although the client 2 owns the server apparatus 200 in the present embodiment, a place where the server apparatus 200 is installed and a person who manages the server apparatus 200 are not particularly limited. It is only required that the client 2 directly or indirectly manage the server apparatus 200.

The imaging device 100 and the server apparatus 200 are connected to each other through a network such as the Internet and communicate information with each other.

According to the present disclosure, first, the photographer 1 obtains a large number of images using the imaging device 100 and transmits the images to the server apparatus 200 owned by the client 2 through the network. The client 2 also determines whether a desired subject is included in an image through a process using the server apparatus 200. The subject desired by the client 2 will be referred to as an "imaging target" hereinafter. The imaging target is not limited to an object, but may be a person or another living creature. The client 2 transmits an image including or not including the imaging target to the imaging device 100 owned by the photographer 1. The photographer 1 notifies the server apparatus 200 owned by the client 2 whether or not the image includes the imaging target. Details of this process will be described later.

Desirably, there are a plurality of photographers 1. That is, the server apparatus 200 may be connected to a plurality of imaging devices 100.

The client 2 is a person or an organization who needs a large number of images including a certain imaging target in order to, for example, make an image identifier learn the images or evaluate the image identifier. Learning or evaluation accuracy improves when various images can be obtained.

If, therefore, an image captured by the photographer 1 is rare, for example, the client 2 increases a reward of the photographer 1.

A rare image, for example, is an image that is not similar to an image owned by the client 2 including an imaging target but that includes the imaging target. Whether or not an image is rare is determined by calculating, using the server apparatus 200 owned by the client 2, a probability that the image includes an imaging target. If the calculated probability is low but it is determined that the image includes the imaging target, it is determined that the image is rare. If the mobile terminal is capable of obtaining positional information, whether or not an image is rare may be determined using the positional information. As a result, the photographer 1 will actively try to collect images including the imaging target in various places and scenes in order to receive higher rewards. A process for calculating the probability will be described in detail later.

Configuration of Imaging Device 100 and Server Apparatus 200

Figure 2:
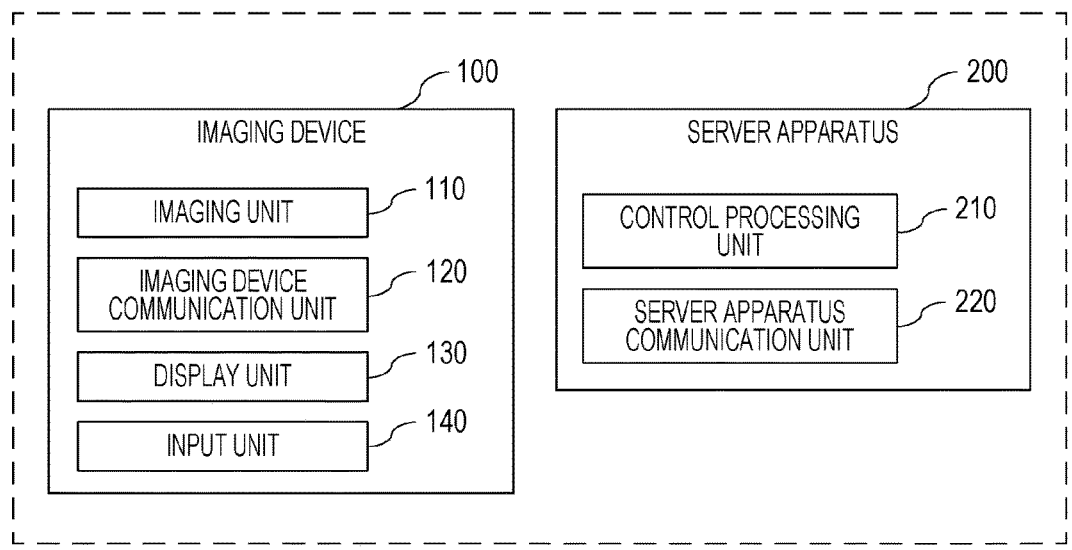
FIG. 2 is a diagram illustrating an example of the configuration of an imaging device and a server.

The configuration of the imaging device 100 and the server apparatus 200 according to the present embodiment will be described with reference to FIG. 2. Various configurations may be applied to the imaging device 100 and the server apparatus 200, but a simplest example will be described hereinafter.

The imaging device 100 may be any mobile imaging and communication terminal such as a wearable terminal typified by smart glasses, a portable device typified by a digital camera or a smartphone, or a camera installed in means of transportation such as an automobile or a motorcycle.

The imaging device 100 includes an imaging unit 110, an imaging device communication unit 120, a display unit 130, and an input unit 140.

The imaging unit 110 manually or automatically obtains an image from a surrounding environment. The imaging unit 110 may be any device having an imaging function included in the imaging device 100. If the imaging device 100 is a smartphone, for example, the imaging unit 110 is an imaging device (charge-coupled device (CCD) image sensor or a complementary metal-oxide-semiconductor (CMOS) image sensor) included in the smartphone.

The imaging device communication unit 120 enables the imaging device 100 and the server apparatus 200 to communicate with each other. The imaging device communication unit 120 may be any general-purpose communication module and is not particularly limited. A communication method employed for the communication with the server apparatus 200 is not particularly limited, and may be third generation (3G), long-term evolution (LTE), Wi-Fi (registered trademark), or the like.

The display unit 130 displays a captured image and an operation screen. The display unit 130 may be any general-purpose display device and is not particularly limited.

The input unit 140 receives a result of a determination made by the photographer 1 as to whether the captured image displayed on the display unit 130 includes an imaging target. The input unit 140 may be any kind of interface such as buttons, a touch panel, or voice input.

The imaging device 100 need not include all the above-described components (the imaging unit 110, the imaging device communication unit 120, the display unit 130, and the input unit 140). Some of these components may be included in another apparatus. For example, the imaging unit 110 may be achieved by a camera, and the imaging device communication unit 120 may be achieved by a communication device such as a smartphone. As the imaging unit 110, any kind of camera capable of communicating with the imaging device communication unit 120, such as a common camera, a wearable camera, or a vehicle camera, may be used. If the imaging unit 110 is a device capable of constantly capturing images, such as smart glasses or a wearable camera, a large number of images can be randomly obtained through automatic capture. The quality of images obtained by the imaging unit 110 need not be high.

The server apparatus 200 includes a control processing unit 210 and a server apparatus communication unit 220.

Figure 3:
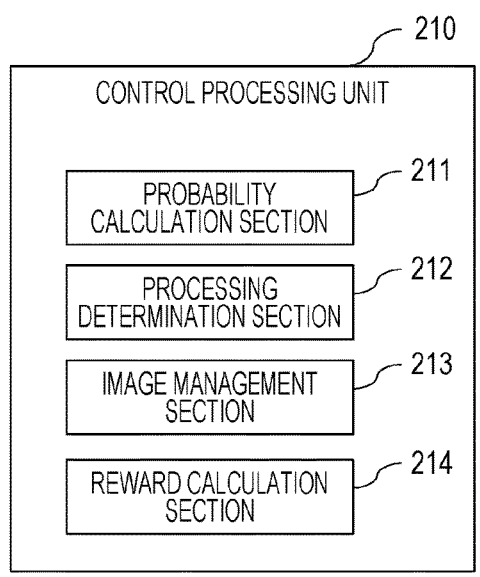
FIG. 3 is a diagram illustrating an example of a functional configuration of a control processing unit.

The control processing unit 210 will be described in detail with reference to FIG. 3. The control processing unit 210 includes a probability calculation section 211, a processing determination section 212, an image management section 213, and a reward calculation section 214.

The probability calculation section 211 calculates a probability that a certain image captured by the imaging device 100 includes an imaging target.

The processing determination section 212 determines a type of processing to be performed on the certain image in accordance with the probability that the certain image includes the imaging target calculated by the probability calculation section 211.

The image management section 213 stores an image obtained by the imaging unit 110 and determined by the input unit 140 or the processing determination section 212 to include an imaging target. The image management section 213 also removes an image obtained by the imaging unit 110 and determined by the input unit 140 or the processing determination section 212 not to include an imaging target.

The reward calculation section 214 calculates a reward of the photographer 1 for an image including an imaging target using a probability that the image includes the imaging target calculated by the probability calculation section 211. If the image has positional information, the reward calculation section 214 may calculate a reward using the positional information.

The server apparatus communication unit 220 enables the components of the server apparatus 200 to communicate with one another and the imaging device 100 and the server apparatus 200 to communicate with each other. The server apparatus communication unit 220 may be a communication module similar to the imaging device communication unit 120.

The server apparatus 200 need not necessarily include both the above-described components (the control processing unit 210 and the server apparatus communication unit 220). The control processing unit 210 need not necessarily include all the above-described functions (the probability calculation section 211, the processing determination section 212, the image management section 213, and the reward calculation section 214). Some components or functions may be included in another apparatus. A person other than the client 2 may own an apparatus including some components or functions.

Process Flow

Next, a process flow according to the present embodiment will be described with reference to FIG. 4.

Figure 4:
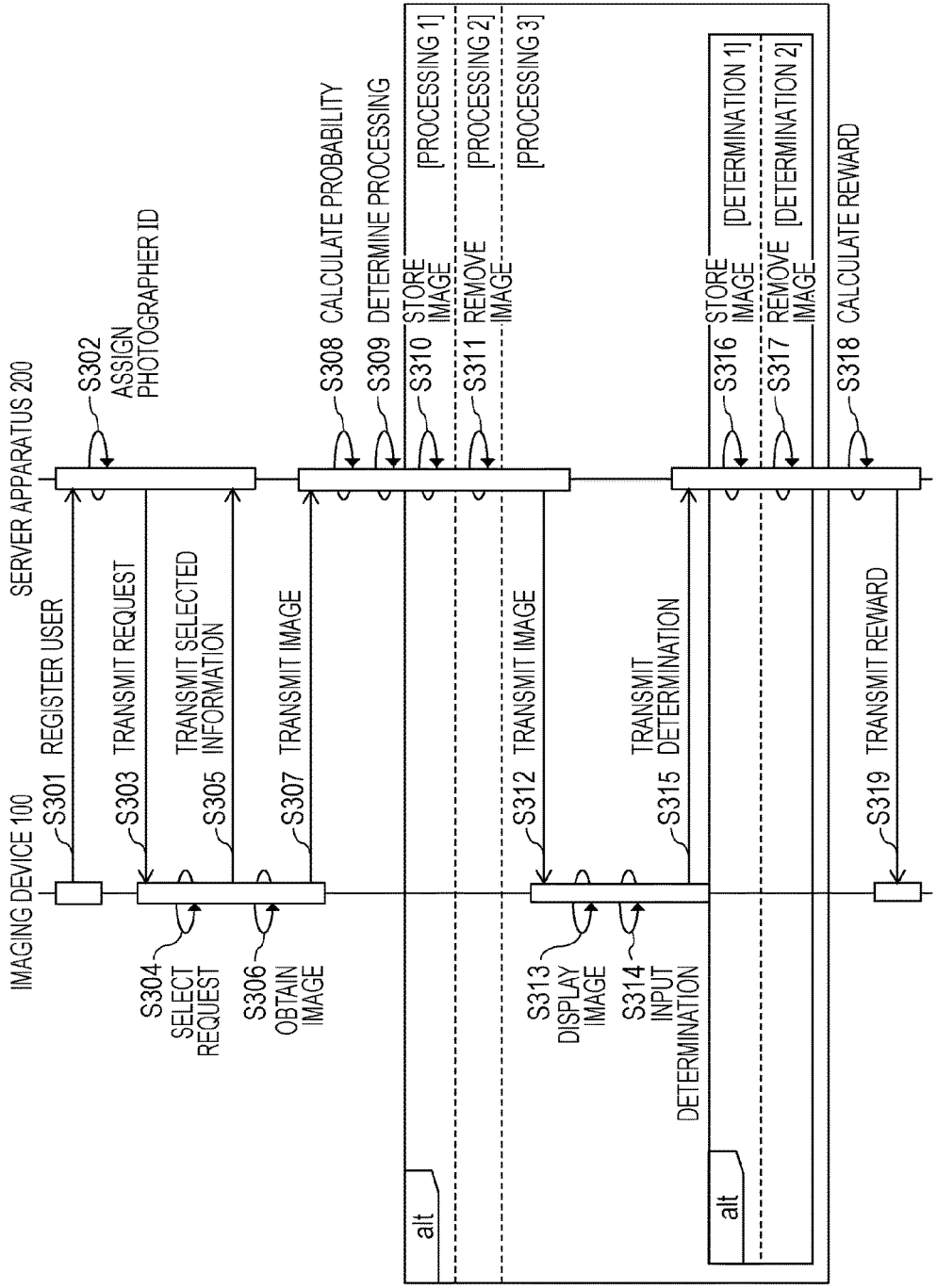
FIG. 4 is a diagram illustrating an example of a process performed between the imaging device and the server.

FIG. 4 is a diagram illustrating an example of a process performed between the imaging device 100 and the server apparatus 200.

The imaging device 100 captures an image and manually determines whether the image includes an imaging target. The imaging device 100 performs step S304, in which request information is selected, step S306, in which an imaging process is performed, step S313, in which an image transmitted in step S312, which will be described later, is displayed, and step S314, in which a determination whether the displayed image includes the imaging target is made.

The server apparatus 200 calculates a probability that an image includes an imaging target and determines a type of processing to be performed on the image. The server apparatus 200 performs step S302, in which a photographer identifier (ID) is assigned, step S308, in which the probability that an image includes an imaging target is calculated, step S309, in which a type of process to be performed on the image is determined on the basis of the probability calculated in step S308, step S310, in which an image (first image) obtained in step S307, which will be described later, is stored, step S311, in which the first image is removed, step S316, in which an image (second image) determined in step S314 to include the imaging target is stored, step S317, in which the second image is removed, and step S318, in which a reward for the image is calculated.

The imaging device 100 and the server apparatus 200 communicate data with each other. In step S301, a user is registered. In step S303, request information is transmitted. In step S305, selected request information is transmitted. In step S307, an obtained image is transmitted. In step S312, an image to be subjected to a determination is transmitted. In step S315, a result of the determination made on the image is transmitted. In step S319, a reward based on the calculation performed in step S318 is transmitted.

Details of the above-mentioned steps will be described hereinafter.

In step S301, the photographer 1 registers himself/herself to the server apparatus 200 as a user using the imaging device 100. That is, in step S301, the imaging device 100 transmits registration information received from the photographer 1 to the server apparatus 200. The registration information may include, for example, information regarding a terminal used, a place of residence, a range of knowledge, age, and gender, as well as a name.

Next, in step S302, the server apparatus 200 assigns a photographer ID, which is an ID of a user (photographer 1) who has registered himself/herself, to the imaging device 100.

Alternatively, in step S302, the server apparatus 200 may assign a device ID, which is an ID of an imaging device (imaging device 100) used by a user who has registered himself/herself, to the imaging device 100.

Alternatively, if the user uses the imaging device 100 and a terminal apparatus (not illustrated) that communicates with the server apparatus 200 and the terminal apparatus obtains an image captured by the imaging device 100 and transmits the obtained image to the server apparatus 200, for example, the server apparatus 200 may, in step S302, associate a photographer ID and device IDs of the plurality of devices (the imaging device 100 and the terminal apparatus in this case) used by the photographer 1, to which the photographer ID is assigned, with each other and assign the photographer ID and the device IDs.

Next, in step S303, the server apparatus 200 transmits (introduces) request information to the imaging device 100. After step S302, the server apparatus 200 may select a request to be introduced to the imaging device 100 using the information registered in step S302. The request information transmitted in step S303 may include a plurality of pieces of request information. The plurality of pieces of request information may include a request from the client 2 and a request from another person or organization. More specifically, the request information includes information specifying an imaging target such as a dog or an automobile.

Next, in step S304, the imaging device 100 receives a piece of request information selected by the photographer 1. The photographer 1 selects a desired piece of the request information received by the imaging device 100 in step S303 to determine the request information to be executed. The photographer 1 selects the request information using the input unit 140 (e.g., the buttons, the touch panels, or the voice input) of the imaging device 100. That is, as a result of the processing in step S304, the imaging target is determined.

Next, in step S305, the imaging device 100 transmits the request information selected in step S304 and the photographer ID of the imaging device 100 to the server apparatus 200.

Next, in step S306, the imaging unit 110 of the imaging device 100 obtains an image from an environment around the photographer 1. The imaging unit 110 automatically obtains an image or the photographer 1 manually obtains images using the imaging unit 110. If the imaging unit 110 automatically obtains an image, the imaging unit 110 receives an instruction from a predetermined crowdsourcing company and obtains an image in front of the imaging unit 110 at intervals of tens of seconds to several minutes. Alternatively, if the imaging unit 110 automatically obtains an image, the imaging unit 110 may obtain an image in front thereof in accordance with positional information regarding the imaging device 100. If there are two points X and Y and the number of images at the point X is smaller than the number of images at the point Y, for example, more images that are not similar to other images can be obtained by making a frequency of obtaining an image at the point X higher than a frequency of obtaining an image at the point Y. The obtained image is stored in a recording unit (not illustrated) of the imaging device 100. The image may be temporarily stored and removed after being transmitted in step S307, which will be described hereinafter.

Next, in step S307, the imaging device communication unit 120 of the imaging device 100 transmits the image obtained by the imaging unit 110 to the server apparatus communication unit 220. That is, in step S307, the server apparatus communication unit 220 receives the image transmitted to the server apparatus 200 from the imaging device communication unit 120. At this time, the photographer ID or the device ID, positional information during image capture, information regarding a terminal used, or the like may be transmitted along with the image. A timing at which the imaging device communication unit 120 transmits the image to the server apparatus 200 is not particularly limited. The imaging device communication unit 120 may transmit an image each time an image is captured in step S306, or the imaging device communication unit 120 may transmit images when a certain number of images have been obtained. Alternatively, the photographer 1 may transmit an image by specifying a desired timing through the input unit 140.

Next, in step S308, the probability calculation section 211 calculates a probability that the image received in step S307 includes the imaging target determined in step S304. The probability calculation section 211 calculates the probability, for example, by inputting the image received in step S307 to an arithmetic unit, which is constructed in advance through deep learning and included in the control processing unit 210, for identifying the imaging target. The arithmetic unit may be constructed not through deep learning but through the HOG, the SVM, or a method for recognizing an image in which these methods are combined with each other.

In step S309, the processing determination section 212 determines a type of processing to be performed on the basis of the probability calculated by the probability calculation section 211. Details of the processing in step S309 will be described with reference to FIG. 5. It is assumed that probabilities A and B corresponding to thresholds necessary to make a determination are set before step S309 is performed. The probability A is higher than the probability B. In step S309, the processing determination section 212 receives the probability calculated by the probability calculation section 211. The processing determination section 212 determines whether the input probability is higher than the probability A (step S3901). If the probability calculated by the probability calculation section 211 is higher than the probability A (YES in step S3901), the processing determination section 212 determines that the image used for calculating the input probability includes the imaging target, and step S310 is performed. If the probability calculated by the probability calculation section 211 is equal to or lower than the probability A (NO in step S3901), step S3902 is performed. In step S3902, the processing determination section 212 determines whether the probability calculated by the probability calculation section 211 is lower than the probability B. If the probability calculated by the probability calculation section 211 is lower than the probability B (YES in step S3902), the processing determination section 212 determines that the image used for calculating the input probability does not include the imaging target, and step S311 is performed.

If the probability calculated by the probability calculation section 211 is equal to or higher than the probability B (NO in step S3902), step S312 is performed.

Figure 5:
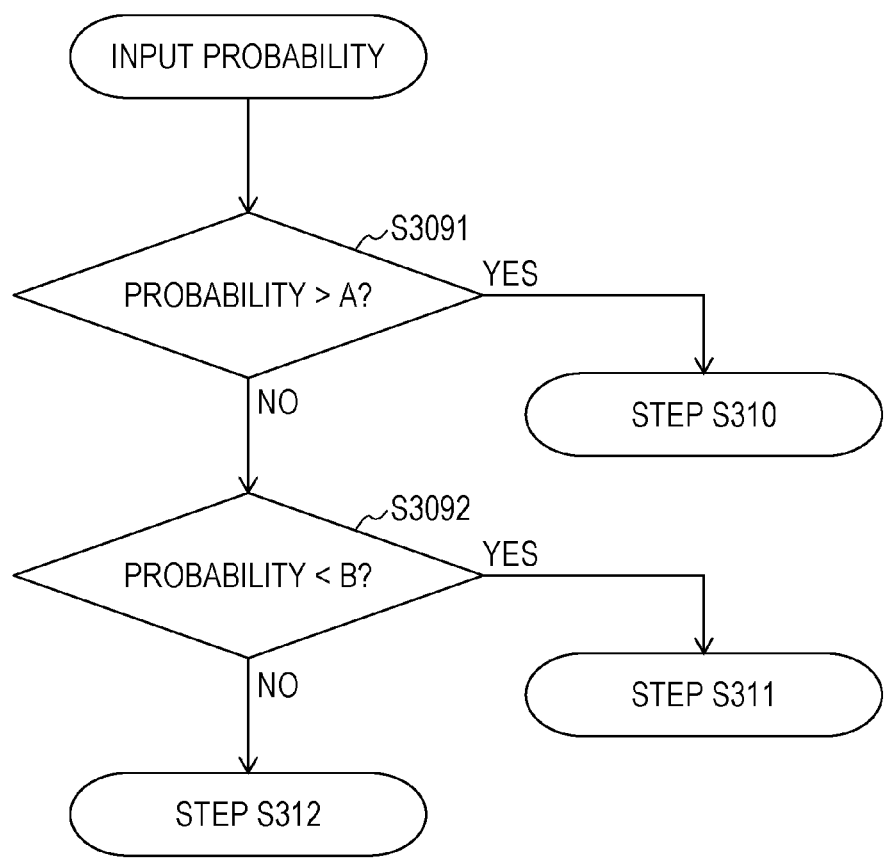
FIG. 5 is a flowchart illustrating an example of a process relating to calculation of probability and a determination as to a type of processing to be performed.
Figure 6:
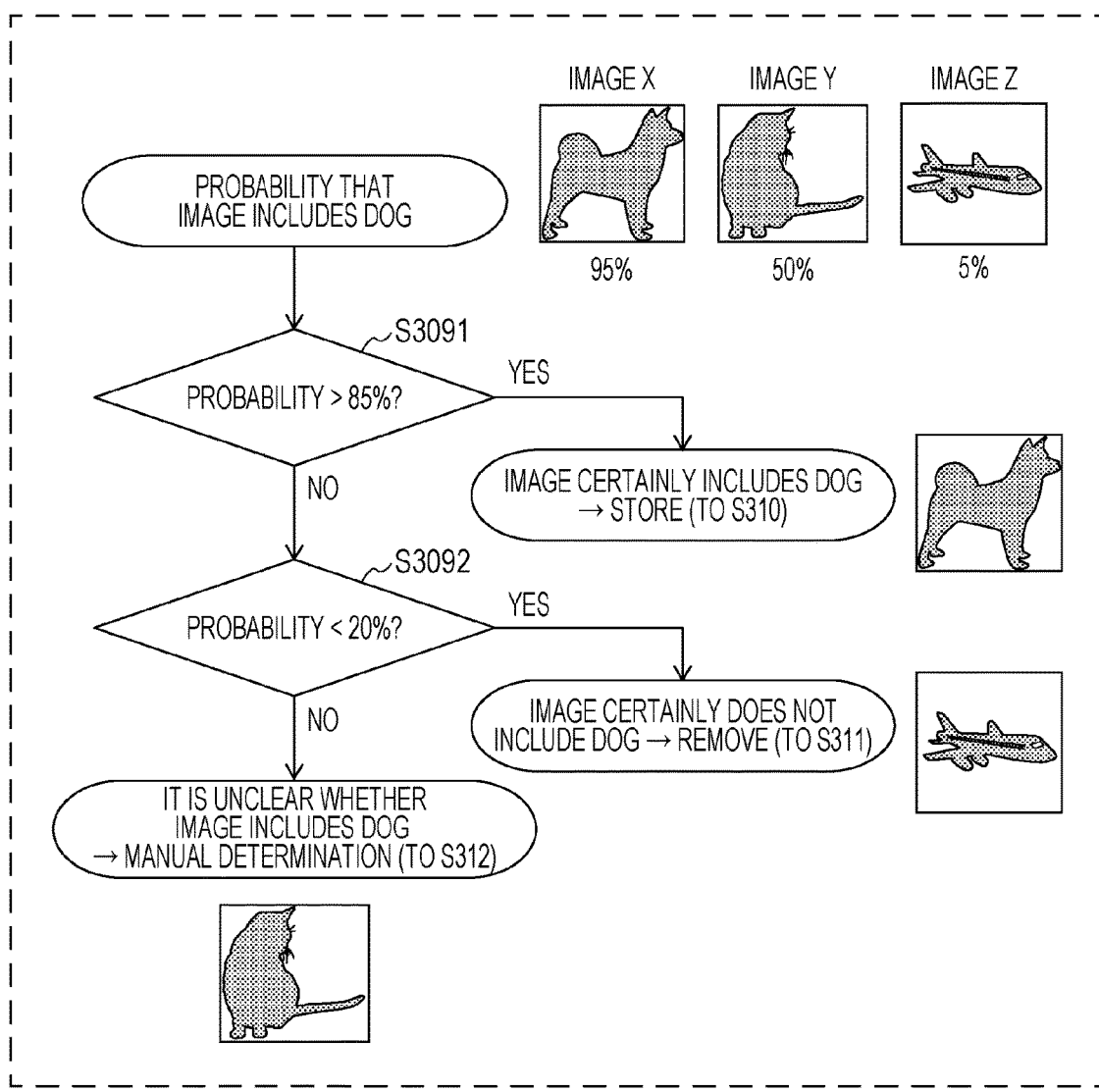
FIG. 6 is a flowchart illustrating the example of the process relating to the calculation of probability and the determination as to a type of processing to be performed.

Since the processing illustrated in FIG. 5 is performed in step S309, if the probability calculated by the probability calculation section 211 is higher than the probability A, the processing determination section 212 determines that the image used for calculating the input probability includes the imaging target, and step S310 is performed. If the probability calculated by the probability calculation section 211 is equal to or lower than the probability A and lower than the probability B, the processing determination section 212 determines that the image used for calculating the probability does not include the imaging target, and step S311 is performed. If the probability calculated by the probability calculation section 211 is equal to or lower than the probability A but equal to or higher than the probability B, step S312 is performed. The probabilities A and B necessary to make the determination may be changed in accordance with a burden of the photographer 1 or a necessary level of an image. A calculator (also referred to as the "arithmetic unit") used by the probability calculation section 211 to calculate the probability that an image includes an imaging target may be newly created (or reconstructed) using collected images (e.g., images to which a tag of an imaging target has been added) and updated. The probabilities A and B may be changed when the calculator of the probability calculation section 211 is updated. The accuracy of the calculator of the probability calculation section 211 improves if the calculator is updated using newly obtained images. When the probability can be calculated more accurately, the number of images to which tags are manually added can be reduced by appropriately setting the probabilities A and B. A specific example of step S309 will be described with reference to FIG. 6. FIG. 6 illustrates a specific example of step S309 at a time when the imaging target is a dog. Three images obtained by the imaging device 100 will be referred to as an "image X", an "image Y", and an "image Z". In this case, in step S308, the probability calculation section 211 calculates the probability that each of the images includes a dog. It is assumed that it has been found that, as a result of step S308, the probability that the image X includes a dog is 95%, the probability that the image Y includes a dog is 50%, and the probability that the image Z includes a dog is 5%. It is also assumed that the probabilities A and B used for making a determination are 85% and 20%, respectively. In step S309, the processing determination section 212 receives the probabilities calculated by the probability calculation section 211. Since the probability that the image X includes a dog is higher than 85%, the processing determination section 212 determines that the image X includes a dog, and the process proceeds to step S310 to store the image X in the server apparatus 200. Since the probability that the image Y includes a dog is equal to or lower than 85% but equal to or higher than 20%, the processing determination section 212 determines that it is not clear whether the image Y includes a dog, and the process proceeds to step S312 to make a manual determination. Since the probability that the image Z includes a dog is lower than 20%, the processing determination section 212 determines that the image Z does not include a dog, and the process proceeds to step S311 to remove the image Z.

The process flow will be described again with reference to FIG. 4. In step S310, the image management section 213 adds a tag of the imaging target to the image determined in step S309 to include the imaging target (the image whose probability is higher than the probability A) and stores the image in a memory, which is not illustrated, included in the server apparatus 200. The memory is a writable recording medium such as a hard disk or a writable semiconductor memory.

In step S311, the image management section 213 removes the image determined in step S309 not to include the imaging target (the image whose probability is lower than the probability B) without adding the tag of the imaging target.

In step S312, the server apparatus communication unit 220 transmits, to the imaging device 100, the image whose probability has been determined in step S309 to be equal to or lower than the probability A but equal to or higher than the probability B and request reception information for requesting addition of a tag corresponding to appropriate information to the image. That is, in step S312, the imaging device communication unit 120 receives the image transmitted to the imaging device 100 from the server apparatus communication unit 220.

The image whose probability has been determined in step S309 to be equal to or lower than the probability A but equal to or higher than the probability B, for example, is an image received in step S307 from the imaging device 100 through the network.

If the photographer ID or the device ID has been received in step S307 along with the image and the probability of the image has been determined in step S309 to be equal to or lower than the probability A but equal to or higher than the probability B, for example, the photographer ID or the device ID received in step S307 along with the image is identified in step S312. The image and the request reception information are then transmitted to a device corresponding to the identified photographer ID or device ID. It is assumed that, for example, a plurality of devices are associated with the photographer ID of the photographer 1 and registered in the registration of a user (the photographer 1 in this case) in step S302. In this case, in step S312, the image and the request reception information may be transmitted to a device (e.g., a smartphone or a tablet mobile terminal) that is associated with the photographer ID and with which an operation for adding a tag can be easily performed. In doing so, the operation for adding a tag can be easily performed.

Alternatively, in step S312, the server apparatus communication unit 220 may transmit the image and the request reception information to a device whose photographer ID is different from the photographer ID received in step S307 along with the image. That is, the image may be transmitted to a person (photographer) different from the person who transmitted the image to the server apparatus 200 (the person who has obtained the image). When the image is transmitted to an available photographer different from the person who has obtained the image, a tag can be promptly added. Alternatively, when the image is transmitted to a plurality of photographers, a tag can be added more accurately. If the photographer ID is transmitted in step S307 along with the image, the image can be transmitted to the person who has obtained the image.

Alternatively, in step S312, the device ID received in step S307 along with the image may be identified, and the image and the request reception information may be transmitted to a device whose device ID is different from the identified device ID.

In step S313, the display unit 130 receives the request reception information received by the imaging device communication unit 120 and displays an instruction screen on which the received image is displayed and the photographer 1 determines, using the terminal, whether the image includes the imaging target. The instruction screen includes, for example, icons for determining whether the image includes the imaging target (e.g., icons corresponding to "yes" and "no").

In step S314, the input unit 140 receives a result of a determination made by the photographer 1 as to whether the image displayed on the display unit 130 includes the imaging target.

Figure 7:
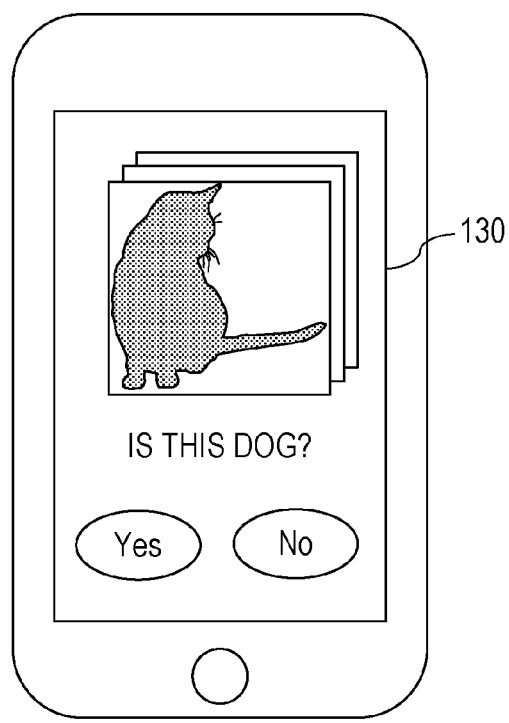
FIG. 7 is a diagram illustrating an example of a display screen of a terminal at a time when a determination is made.

FIG. 7 illustrates an example of an interface at a time when the image is displayed in step S313. If it has been determined in step S309 that it is not clear whether the image includes the imaging target (the image transmitted in step S312 whose probability is equal to or lower than the probability A but equal to or higher than the probability B), the image is displayed on the display unit 130 as in the example illustrated in FIG. 7. The photographer 1 determines in step S314 whether the image displayed in step S313 includes the imaging target, and inputs a result of the determination using the input unit 140.

In step S315, the imaging device communication unit 120 transmits, to the server apparatus 200, the result of the determination, which has been input using the input unit 140, made by the photographer 1 as to whether the image includes the imaging target. That is, in step S315, the server apparatus communication unit 220 receives the result of the determination, which has been input using the input unit 140, made by the photographer 1 as to whether the image includes the imaging target. If a result of the determination that the image includes the imaging target is received, step S316 is performed. If a result of the determination that the image does not include the imaging target is received, step S317 is performed.

In step S316, the image management section 213 adds the tag of the imaging target to the image determined in step S314 to include the imaging target and stores the image in the memory, which is not illustrated, included in the server apparatus 200. If an image to which the tag of the imaging target has been added has been received in step S315 as a result of the determination that the image includes the imaging target, the image management section 213 may store the image in the memory in step S316.

In step S317, the image management section 213 removes the image determined in step S314 not to include the imaging target.

In step S318, the reward calculation section 214 calculates a reward using the probability, which has been calculated in step S310, that the image includes the imaging target. A higher reward is calculated, for example, as the number of images transmitted in step S312 increases (that is, as the number of images whose probabilities have been determined in step S309 to be equal to or lower than the probability A but equal to or higher than the probability B increases).

In step S319, the server apparatus 200 transmits the reward to the imaging device 100 to give the photographer 1 the reward. The reward may be any type of benefit to the photographer 1, such as money, digital money, game points, a discount ticket, or a lottery ticket.

As described above, the probability is calculated in step S308 using, for example, an arithmetic unit, which is included in the control processing unit 210, for identifying an imaging target constructed in advance through deep learning. More specifically, for example, deep learning is performed using a data set of a plurality of learning images prepared for recognition of an imaging target, and an arithmetic unit for identifying the imaging target is constructed in advance.

The plurality of images stored in step S310 or S316 may be added to the data set of the plurality of learning images and deep learning may be performed in order to update (or reconstruct) the arithmetic unit for identifying an imaging target. By updating the arithmetic unit, the accuracy (or reliability) of calculating the probability using the arithmetic unit improves.

The arithmetic unit may be updated, for example, when the image is stored in step S310 or S316 or before step S308 is performed.

The probabilities A and B necessary to make the determination in step S309 may be different between when the probability is calculated using an arithmetic unit constructed using less than a certain number of images and when the probability is calculated using an arithmetic unit constructed using the certain number of images or more.

For example, the probability A set when the probability is calculated using the arithmetic unit constructed using less than the certain number of images may be higher than the probability A set when the probability is calculated using the arithmetic unit constructed using the certain number of images or more.

In addition, for example, the probability B set when the probability is calculated using the arithmetic unit constructed using less than the certain number of images may be lower than the probability B set when the probability is calculated using the arithmetic unit constructed using the certain number of images or more. The certain number may be a value according to an imaging target to be recognized, for example, or may be a value arbitrarily determined by a manager who manages the server apparatus 200.

An image collection and tag addition system that obtains a large number of images and that, for an image for which a determination whether the image includes an imaging target can be easily made, makes the determination in a short period of time using a recognizer or that, for an image for which it is difficult to make a determination whether the image includes an imaging target, makes an accurate determination can thus be constructed. In the examples of the related art, when a large number of images including an imaging target are collected, many images undesirably reflect a photographer's intension, and the images undesirably exhibit a certain tendency. In addition, a specific method for adding information indicating whether or not the imaging target is included to a large number of images that do not reflect the photographer's intention has not been examined. A manual operation for adding information indicating whether or not the imaging target is included to all the collected images needs to be performed, which is troublesome. In the present disclosure, however, a large number of various images that include a desired imaging target and that do not reflect a photographer's intention can be comprehensively collected, and intended information (e.g., information indicating whether or not the imaging target is included) can be efficiently added to the large number of images while suppressing human costs and burdens in the entirety of the system. An image recognizer having higher recognition performance can thus be constructed using, as learning images, a data set of a large number of various images to which information indicating that a desired imaging target is included is added (an image data set that does not include similar images). As a result, an image recognition system employing a method such as deep learning can be efficiently and accurately constructed compared to the examples of the related art.

Although the process in the present disclosure has been described with reference to the embodiment, a person or an apparatus that performs the process is not particularly limited. A processor (described later) or the like incorporated into a particular locally arranged apparatus may perform the process, instead. A cloud server arranged in a place different from one in which a local apparatus is arranged may perform the process, instead. In addition, the local apparatus and the cloud server may share information in order to share the process described in the present disclosure. Aspects of the present disclosure will be described hereinafter.

(1) The above-described apparatus is specifically a computer system including a microprocessor, a read-only memory (ROM), a random-access memory (RAM), a hard disk unit, a display unit, a keyboard, and a mouse. The RAM or the hard disk unit stores a computer program. When the microprocessor operates in accordance with the computer program, each component achieves a function thereof. The computer program includes a plurality of command codes indicating instructions to the computer system for achieving certain functions.

(2) Part or all of the components of the apparatus may be achieved by a system large-scale integration (LSI) circuit. The system LSI circuit is a super-multifunctional LSI circuit fabricated by integrating a plurality of components on a chip. More specifically, the system LSI circuit is a computer system including a microprocessor, a ROM, and a RAM. The RAM includes a computer program. When the microprocessor operates in accordance with the computer program, the system LSI circuit achieves functions thereof.

(3) Part or all of the components of the apparatus may be achieved by an IC card or a module removably attached to the apparatus. The IC card or the module is a computer system including a microprocessor, a ROM, and a RAM. The IC card or the module may include the super-multifunctional LSI circuit. When the microprocessor operates in accordance with the computer program, the IC card or the module achieves functions thereof. The IC card or the module may be tamper-resistant.

(4) The present disclosure may be the above-described method. Alternatively, the present disclosure may be a computer program that achieves the method using a computer, or may be a digital signal including the computer program.

(5) In addition, the present disclosure may be a computer-readable recording medium storing the computer program or the digital signal, such as a flexible disk, a hard disk, a compact disc read-only memory (CD-ROM), a magneto-optical (MO) disk, a digital versatile disc (DVD), a DVD-ROM, a DVD-RAM, a Blu-ray disc (BD; registered trademark), or a semiconductor memory. The present disclosure may be the digital signal stored in the recording medium.

Alternatively, the present disclosure may be the computer program or the digital signal transmitted through an electrical communication line, a wireless or wired communication line, a network typified by the Internet, datacasting, or the like.

Alternatively, the present disclosure may be a computer system including a microprocessor and a memory. The memory may store the computer program, and the microprocessor may operate in accordance with the computer program.

Alternatively, the present disclosure may be implemented by another independent computer system by storing the program or the digital signal in the recording medium and transporting the recording medium or by transporting the program or the digital signal through the network or the like.

(6) The above embodiment and modifications may be combined with one another.

The present disclosure relates to a method for recognizing an object and an object recognition system capable of accurately recognizing an object in an image and is effective as an imaging apparatus in a digital camera, a movie camera, a monitoring camera, a vehicle camera, a wearable camera, or the like.

What is claimed is:

1. A method executed by a processor of the server, the method comprising:
    obtaining an image transmitted, through a network, from any of at least one terminal having a function of capturing an image or obtaining an image from another device;
    calculating a probability that the obtained image includes a certain imaging target;
    adding, if the probability is higher than a first threshold, information indicating the certain imaging target to the image;
    not adding, if the probability is lower than a second threshold, the information indicating the certain imaging target to the image; and
    transmitting, if the probability is equal to or higher than the second threshold and if the probability is equal to or lower than the first threshold, the image and request reception information for requesting addition of the information to the image to any of the at least one terminal through the network; wherein the first threshold and the second threshold are different between when the probability is calculated using a calculator constructed using less than a certain number of images to which the information has been added and when the probability is calculated using a calculator constructed using the certain number of images or more to which the information has been added.

2. The method according to claim 1,
    wherein the request reception information includes a command for displaying an instruction screen for receiving, from the at least one terminal, a result of a determination whether the image includes the imaging target.

3. The method according to claim 1, further comprising:
    obtaining, from the at least one terminal, a result of a determination whether the image includes the imaging target received on the basis of the instruction screen;
    adding, if the result of the determination indicates that the image includes the imaging target, information indicating the certain imaging target to the image; and
    not adding, if the result of the determination indicates that the image does not include the imaging target, the information indicating the certain imaging target to the image.

4. The method according to claim 1,
    wherein, in the calculating, a calculator, which is included in the server, for calculating a probability that an image includes a certain imaging target is used.

5. The method according to claim 4,
    wherein the calculator is constructed through deep learning, a histogram of oriented gradients, a support vector machine, or any selective combination thereof.

6. The method according to claim 4, further comprising:
    accumulating, by adding information to a plurality of images, the plurality of images to which the information has been added; and
    updating the calculator using the plurality of images to which the information has been added.

7. The method according to claim 4,
    wherein, if the probability is calculated using the calculator constructed using less than the certain number of images to which the information has been added, the first threshold is set larger and the second threshold is set smaller than when the probability has been calculated using the calculator constructed using the certain number of images or more to which the information has been added.

8. The method according to claim 1,
    wherein, in the obtaining, a device identifier of the at least one terminal is obtained from the at least one terminal along with the image, and
    wherein, in the transmitting, the device identifier obtained along with the image is identified, and the image and the request reception information are transmitted to the at least one terminal having the identified device identifier.

9. The method according to claim 1,
    wherein, in the obtaining, a device identifier of the at least one terminal is obtained from the at least one terminal along with the image, and
    wherein, in the transmitting, the device identifier obtained along with the image is identified, and the image and the request reception information are transmitted to a terminal different from the at least one terminal having the identified device identifier.

10. The method according to claim 1, further comprising:
    transmitting, after determining whether to add the information to the image, information for providing a reward to the at least one terminal,
    wherein, if the probability relating to the image is equal to or higher than the second threshold and if the probability is equal to or lower than the first threshold, the reward is set higher than when the probability is higher than the first threshold or lower than the second threshold.

11. The method according to claim 1,
    wherein, before the image is obtained, a determination as to the certain imaging target is received from the at least one terminal.

12. The method according to claim 1,
    wherein at least any of the obtaining, the calculating, and the adding is performed by the processor.

13. A server apparatus comprising:
    a processor,
    wherein the processor performs a process including obtaining an image transmitted, through a network, from any of at least one terminal having a function of capturing an image or obtaining an image from another device;

calculating a probability that the obtained image includes a certain imaging target;

adding, if the probability is higher than a first threshold, information indicating the certain imaging target to the image;

not adding, if the probability is lower than a second threshold, the information indicating the certain imaging target to the image; and transmitting, if the probability is equal to or higher than the second threshold and if the probability is equal to or lower than the first threshold, the image and request reception information for requesting addition of the information to the image to any of the at least one terminal through the network; wherein the first threshold and the second threshold are different between when the probability is calculated using a calculator constructed using less than a certain number of images to which the information has been added and when the probability is calculated using a calculator constructed using the certain number of images or more to which the information has been added.

14. A non-transitory computer-readable recording medium storing a program, the program causing a computer to:

calculate a probability that an image transmitted, through a network, from any of at least one terminal having a function of capturing an image or obtaining an image from another device includes a certain imaging target;

add, if the probability is higher than a first threshold, information indicating the certain imaging target to the image;

not add, if the probability is lower than a second threshold, the information indicating the certain imaging target to the image; and transmit, if the probability is equal to or higher than the second threshold and if the probability is equal to or lower than the first threshold, the image and request reception information for requesting addition of the information to the image to any of the at least one terminal through the network; wherein the first threshold and the second threshold are different between when the probability is calculated using a calculator constructed using less than a certain number of images to which the information has been added and when the probability is calculated using a calculator constructed using the certain number of images or more to which the information has been added.

* * * * *